Dec. 9, 1930.  F. L. PRESTON  1,784,109
CHEMICAL FURNACE
Filed July 7, 1928
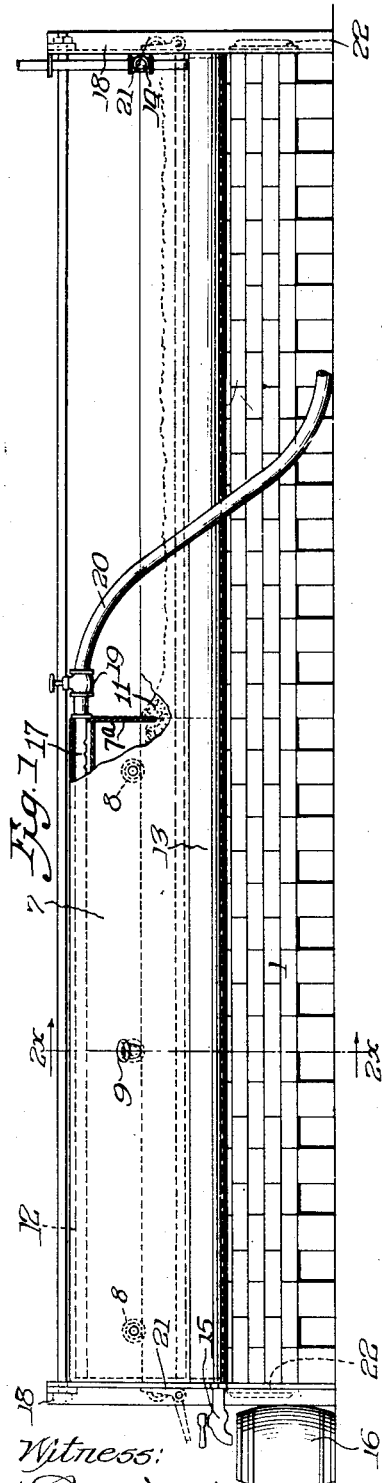
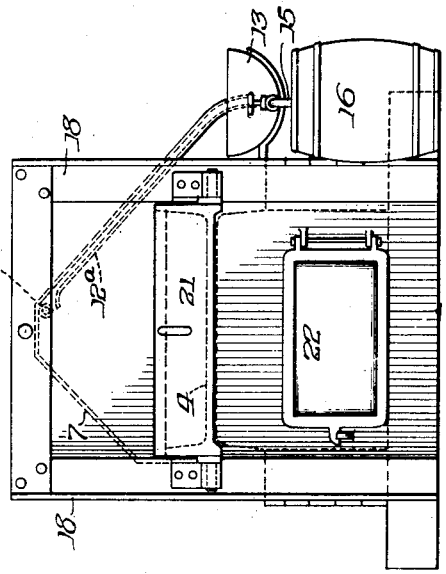
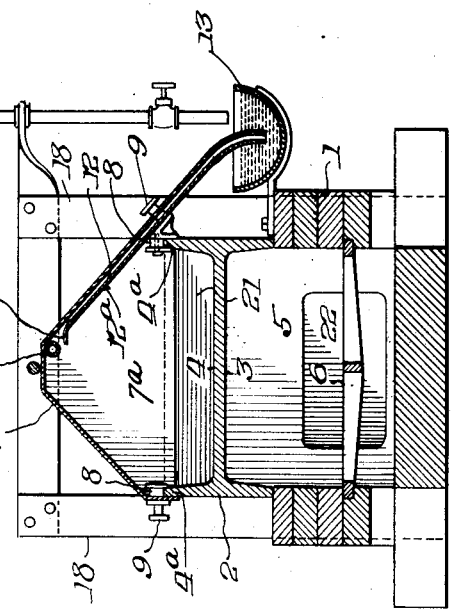
Inventor:
Fredrick L. Preston Patented Dec. 9, 1930

1,784,109

UNITED STATES PATENT OFFICE

FREDERICK L. PRESTON, OF MOBILE, ALABAMA

CHEMICAL FURNACE

Application filed July 7, 1928. Serial No. 291,108.

This invention relates to furnaces used in subjecting mineral substances to the influence of heat in changing their chemical character, for instance, in the process of heating ores in the presence of other substances or reagents, or the process of roasting ores for the purpose of driving off volatilizable constituents.

One object of the invention is to increase the efficiency of the furnace and render it more economical with respect to fuel consumption, heat conservation, convenience, and time consumed in its operation; and to this end, one feature of the invention consists in constructing the furnace of two units so related that the several steps of the operation may proceed successively, first in one unit and then in the other unit, and the voluntarily performed steps, such as charging the raw material into or removing the finished material from one unit, can be carried on while the automatically performed step, such as reaction to the influence of the heat, is occurring in the other unit; the act of enclosing one unit to control the heating operation being made to automatically open up the other unit and expose its hearth for removal of its finished material and recharging with raw material; and waste heat from the heating operation of each unit being so disposed as to pre-heat the charge of the other unit so that the units become reciprocally assisting in their operation.

Another object is to provide a furnace of the kind referred to which, while insuring attainment of the object first named, will be simple and durable in construction and readily producible from standard structural materials in the field as distinguished from in the factory and by relatively unskilled labor; and to this end, another feature of the invention consists in constructing in alignment, end to end, the two units of the furnace, each with its hearth, its combustion chamber, and its own firing arrangement, for instance, by mounting a deeply flanged commercial I-beam or channel upon a masonry foundation and superposing upon it a sheet metal hood, so that the hearth and combustion chamber of each unit constitute in effect continuations of the hearth and combustion chamber, respectively, of the other unit; the fire beneath the hearth of one unit will discharge its products of combustion beneath the hearth of the other unit in a manner to effect the preheating of the charge which is next to be heat treated; and a single hearth enclosure in the form of a hood, properly proportioned to serve in combination with half of the total hearth dimension at any given time and shiftable longitudinally from one end to the other, is adapted to develop the roasting chamber for the two units alternately, and reciprocally enclose a newly laid bed of ore for roasting and expose a finished bed of ore for removal, as already stated.

Another object of the invention is to adapt the hood to trap and collect gases driven off from each unit during heat treatment; to which end, another feature of the invention consists in so constructing a wall of the hood, for instance, from two spaced sheets of metal, that it will serve as a gas flue leading from an upper region of the chamber to a level within and below the surface of water in a gas-absorbing trough at the side of the furnace. The preferred embodiment of this feature involves the use of an absorption trough of such length that it continues from one unit to another, so that the discharge end of the flue, which may be approximately coextensive horizontally with the longitudinal dimension of the hood, will travel in the trough and remain submerged as the hood shifts from one end to the other; and the trough will preferably be equipped with provisions for not only maintaining its water supply but discharging its acidulated water as the latter reaches a desired gravity or Baumé test, the discharge being under conditions which permit the liquid to be conserved as a by-product, for instance, when sulphide ores are being treated and sulphurous anhydride escaping from the hood develops sulphuric acid in the trough.

In the accompanying drawing, in which the preferred embodiment of the invention is shown by way of illustration—

Figure 1 is a side elevation of the furnace, partly in section.

Figure 2 is a transverse section on the line 2x—2x of Figure 1; and

Figure 3 is an end elevation of the furnace.

1 represents the base of the furnace, preferably of masonry, and 2 the hearth suitably bedded on the masonry, preferably formed of a section of commercial I-beam positioned with its flanges vertical so as to provide a heat tunnel 3 on its under side with vertical and horizontal heat absorbing surfaces, and a mineral confining trough 4 on its upper side, likewise having vertical and horizontal surfaces, so that heat is readily absorbed and transferred to the bed of ore, the confines of which are provided by the upper surfaces of the I-beam.

The I-beam 2 combined with the masonry 1 defines a combustion chamber 5 which, while adapted to enclose any suitable source of fire, is here shown as being provided with a trough 6.

7 represents a hood supported by rollers 8 upon a track running longitudinally of the furnace, which in the illustrated embodiment is provided by the upwardly presented flanges 4a of the I-beam. The hood is of such dimensions and design that it will serve as a housing for but one unit of the hearth at a time, and being mounted for travel, it may be conveniently shifted from end to end of the hearth, for instance, by engaging the clinker hook of the furnace over one of the traction studs 9 and thereby made to enclose either unit of the hearth as it is being subjected to heat treatment while leaving the other unit exposed for raking out the finished charge, putting in and spreading a new charge, and ready evaporation of moisture by pre-heating the new charge with the waste heat from the unit that is being fired.

Hood 7 may have end walls 7a depending a sufficient distance to coact with discharge doors 21 at the ends of the hearth, or with the tamping 11 of mineral substance at the middle of the hearth, so that with a fairly snug fit along the sides, the escape of gases from the heat treated unit, even when the ore is of the sulphide class, will be limited sufficiently to make a safe operating environment so long as the hood is properly vented for disposal of the gases. For this last named purpose, hood 7 has a venting flue 12, preferably made by placing a second sheet 12a within the outer sheet of the hood but terminating short of the apex of the heating chamber; and this flue is continued downwardly until it dips into an absorption trough 13 kept supplied with water from any suitable source, such as supply pipe 14, and preferably equipped with a discharge faucet 15 through which its contents may be emptied into any suitable means of disposal, for instance, a barrel or other container 16. Trough 13 is of sufficient length to permit the discharge end of the sheet 12a to remain submerged while the hood traverses its track 4a, so that it serves the hood in position over either unit of the furnace. At the upper end of the flue 12, beneath the hood, there may be located an air jet pipe 17 to create down draft through the flue in case the hood does not close the heating chamber tightly enough to insure development of gas pressure sufficient to force the gas past its water seal 13. Pipe 17 may be provided with a valve 19 adapted to control the flow of air from an air supply pipe 20 into the jet pipe 17.

21 represent doors which permit the raking out of the treated material, and 22 typify doors of any appropriate construction to provide for fire control at the end being fired and discharge of products of combustion at the opposite end.

I claim:

1. A furnace of substantially the character described, comprising two hearth units arranged end to end, a common heating chamber extending beneath both of said hearth units, and a hood adapted to form, with a unit, a heating chamber; said hood being shiftable endwise of the furnace to bring it into coacting relation with either unit of the hearth.

2. A furnace of substantially the character described, comprising two hearth units arranged end to end, having means for heating them, and a hood adapted to form, with a unit, a heating chamber; said hood being shiftable endwise of the furnace to bring it into coacting relation with either unit of the hearth; and said hood having sides in sealing engagement with the hearth and thereby closing the sides of the chamber against free escape of gas, and having end walls extending downwardly to the hearth and cooperating therewith to close the ends of the chamber.

3. A furnace of substantially the character described, comprising two hearth units arranged end to end, having means for heating them, and a hood adapted to form, with a unit, a heating chamber; said hood being shiftable endwise of the furnace to bring it into coacting relation with either unit of the hearth; and said hood having an escape flue for gases and a liquid container into which said flue dips.

4. A furnace of substantially the character described, comprising two hearth units arranged end to end, having means for heating them, and a hood adapted to form, with a unit, a heating chamber; said hood being shiftable endwise of the furnace to bring it into coacting relation with either unit of the hearth; said hood having an escape flue for gases and a liquid container into which said flue dips; and said container extending longitudinally of the furnace and permitting continued submergence of the discharge end of the flue in the shifting of the hood.

5. A furnace of substantially the character described, comprising two hearth units arranged end to end, having means for heating them, and a hood adapted to form, with a unit, a heating chamber; said hood being shiftable endwise of the furnace to bring it into coacting relation with either unit of the hearth; said hood having an escape flue for gases and a liquid container into which said flue dips; and said flue being formed by a wall of the hood and a wall spaced therefrom within the hood, terminating short of the top of the hood, and thereby leaving the upper part of the flue open to the interior of the hood.

6. A furnace of substantially the character described, comprising two hearth units arranged end to end, having means for heating them, and a hood adapted to form, with a unit, a heating chamber; said hood being shiftable endwise of the furnace to bring it into coacting relation with either unit of the hearth; said hood having an escape flue for gases and a liquid container into which said flue dips; and said hood having means providing an air blast into said flue to cause discharge through the flue.

7. In a furnace of substantially the character described, an elongated hearth providing two aligned areas of treatment, and a hood proportioned to enclose one of said areas and shiftable relatively to the hearth to coact with either area at will; said hearth being provided with upwardly presented flanges constituting said walls of the hearth and providing a track for said hood; and said hood being equipped with means adapting it to travel on said track.

Signed at Mobile, Alabama, this 30th day of June, 1928.

FREDERICK L. PRESTON.